UNITED STATES PATENT OFFICE.

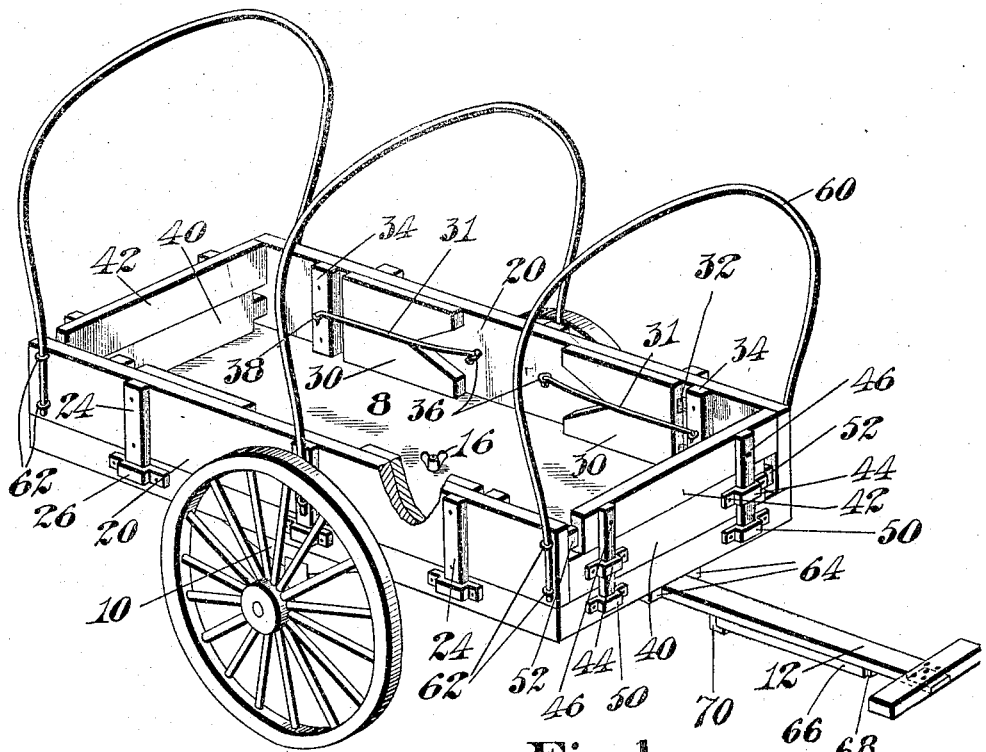
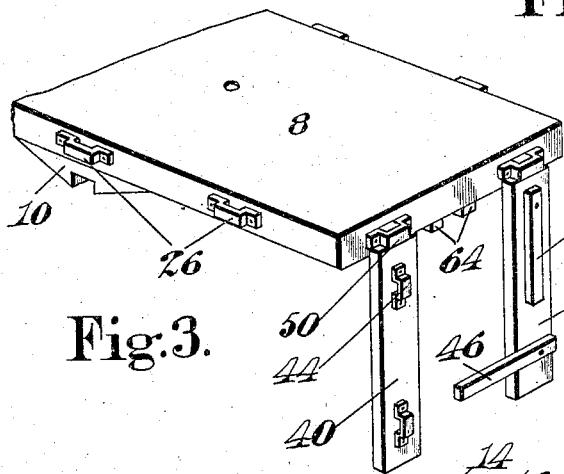
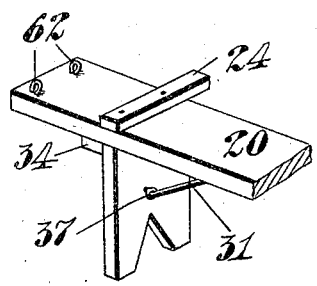
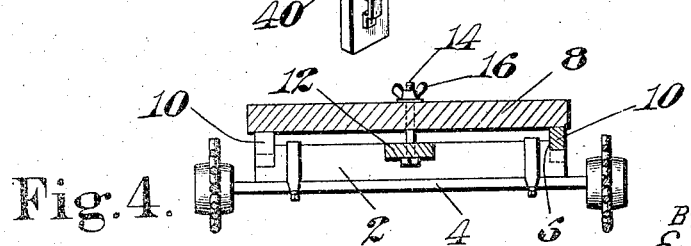

LEONARD S. RANKIN, OF CAMBRIDGE, MASSACHUSETTS.

VEHICLE HAVING A CONVERTIBLE BODY.

1,299,381.  Specification of Letters Patent.  Patented Apr. 1, 1919.

Application filed May 23, 1916. Serial No. 99,403.

*To all whom it may concern:*

Be it known that I, LEONARD S. RANKIN, a citizen of the United States, residing at Cambridge, in the county of Middlesex and State of Massachusetts, have invented certain Improvements in Vehicles Having Convertible Bodies, of which the following description, in connection with the accompanying drawings, is a specification, like reference characters on the drawings indicating like parts in the several figures.

This invention relates to vehicles having convertible bodies and particularly to hand carts or wagons for use by campers or trampers in transporting camp equipment and the like.

Such carts as usually constructed are of use merely for transportation of luggage and are of little use when camp is reached.

The general object of this invention is to provide a cart and body all parts of which will be of use as part of the camp equipment.

As one important feature of the invention the two side portions of the cart body are removable and are provided with suitable supporting means so that each may be converted into a bench of the proper height to sit upon. As shown herein each side portion has two supports hinged to it so as to fold flat against the side portion when not in use and to assume positions substantially at right angles to the side portions when opened, suitable means being provided to hold the supports rigidly in open position.

As another feature of the invention the remaining parts of the cart body are convertible into a table, the bottom of the cart body forming the table top and the end portions of the body being utilized as legs. As shown, the bottom of the body is easily removable from the cart axle and each end portion is separable into two parts, each of which forms a table leg when its end is inserted in a suitable socket provided on the table top, that is, on the cart bottom. These sockets are preferably used also to hold the legs in position when used as end portions of the body.

Other features and advantages of the invention including various constructions and combinations of parts will appear more fully from the following detailed description when read in connection with the accompanying drawing and will be pointed out in the appended claims.

Figure 1 is a perspective view of a two wheeled vehicle constructed in accordance with my invention;

Fig. 2 is a perspective view showing one of the side portions converted into a bench;

Fig. 3 is a perspective view of the bottom and end portions converted into a table; and Fig. 4 is a transverse section taken in front of the axle and showing the manner of removably attaching the body to the axle and tongue.

Referring to Fig. 1 of the drawings, the invention is shown as embodied in a cart of the type known as a "trek" cart. Carts of this type are used by members of the organization known as "Boy Scouts of America" for transportation of luggage or camp equipment when making trips on foot known as "hikes." The bottom of the cart body is attached to the axle of the two wheels by the following means. A block 2 is attached to the axle 4 of the wheels as shown in Fig. 4 and has notches 6 cut at the ends as shown at the right in that figure. The sides of the frame of the cart bottom 8 are provided with notched pieces 10 (Fig. 1) which fit over the ends of the block 2 and into the notches 6 to hold the body from longitudinal and lateral movement. A tongue 12 is tenoned into the block 2 and a bolt 14 is provided which is connected with the tongue 12 and passes through the bottom 8. More than one such bolt may be used if desired. A thumb nut 16 is provided (Fig. 1) to clamp the bottom 8 down upon the tongue and prevent its moving vertically when the cart is in use. It will be seen that by this construction when the nut 16 is removed the body may be easily lifted from the axle and tongue.

The body bottom 8 is provided with removable sides 20 which may be secured to the bottom 8 in any suitable manner and as shown are provided with stake pieces 24 which extend beyond the side pieces sufficiently far to engage suitable sockets in the bottom portion 8, for example, metallic members 26 which are secured to the edge faces of the body bottom 8. It is within the invention, however, to arrange the stake pieces 24 on the inner side of the side pieces 20 and to provide sockets on the body bottom to receive the ends of the stake pieces 24. For example, the cleats 34 may be extended to engage sockets formed in the bottom portion. Each of the side pieces 20 is provided with folding supports 30 which are hinged at 32 to the side pieces 20 and when swung on their hinges to positions substantially at right angles to the side pieces 20 their side faces opposite the hinges engage cleats 34 which help support them in open position, Fig. 2. Means is provided for firmly securing the legs 30 in this position which may comprise rods 31 pivoted at 36 to the side pieces 20 and having their opposite ends formed to engage eyes 37 or other holding means on the legs 30, Fig. 2. When the legs are folded, as shown in Fig. 1, the rods may engage other eyes 38 to hold the legs in folded position. By this construction it will be apparent that the side members of the cart body when they are removed and the legs are opened form two substantial benches suitable to sit upon.

The ends of the body are each removable and each comprises two parts 40, 42. The parts 40 are provided with sockets 44 and the parts 42 have pieces 46 pivoted thereto which are sufficiently long, as shown in Fig. 1, to pass through the sockets 44 and to engage other sockets 50 provided on the end faces of the bottom 8. Each of the parts 40, 42 has its end portion reduced at 52 so as to fit one of the sockets 50 or 26. When the end pieces are each separated into two parts, four members are provided each of which may form a table leg. The bottom of the cart is then taken off after removing the nut 16 and constitutes a table top, one of the end piece parts having its reduced end 52 inserted in each of the sockets 50, as shown in Fig. 3. When in use as legs the parts 42 may have the pivoted pieces 46 folded out of the way as is shown in this figure.

In Fig. 1 bows 60 are shown which are removably supported by suitable eyes 62 on the side pieces. These bows are convenient for supporting a canvas top and when in camp may be used as supports for kettles over the camp fire.

The axle and tongue, after the body is removed for conversion into a table and seats, may be used for transporting logs or fuel for the camp fire.

Stop blocks 64 are attached to the bottom 8 at each side of the tongue 12 to prevent lateral play of the body and tongue. A folding strut or leg 66 may be provided to support the tongue when the cart is not being hauled. As shown, the leg 66 is hinged at 68 to the tongue and a button 70 is provided to hold the leg 66 in folded position.

Having fully described my invention, I claim as new and desire to secure by United States Letters Patent:

1. In a vehicle of the class described, a body bottom, body side pieces having means for attachment to the body bottom, members hinged near each end of the side portions arranged to fold inwardly toward each other flat against the sides and to open outwardly into positions at a substantial angle to the side portions whereby the side portions, when removed from the body, may be converted into benches.

2. In a vehicle of the class described, a removable body having side and end portions detachable from the body bottom, the end portions being constructed and arranged to form a closed end for the body and when removed and arranged in a different relation to the body bottom to transform the bottom into a table.

3. In a vehicle of the class described, a removable body having side and end portions detachable from the body bottom, each end portion being separable into two parts each of which forms a leg to support the bottom as a table.

4. In a vehicle of the class described, an axle and a body comprising a bottom portion and end portions, and means for detachably securing the bottom to the axle, the end portions being constructed and arranged to be detached and arranged in a different relation to the bottom to form legs to support the bottom portion as a table when the bottom portion is removed from the axle.

5. In a vehicle of the class described, an axle and a body comprising a bottom portion having sockets and end portions, and means for detachably securing the bottom to the axle, the end portions each comprising two parts and each part having a reduced end to fit one of the sockets in the bottom portion whereby the end parts may constitute legs for converting the bottom into a table.

6. In a vehicle of the class described, a body, an axle and a tongue secured to the axle, means for preventing relative lateral and longitudinal movement of the axle and body while permitting relative bodily vertical movement of these parts for removal of the body, and means for preventing relative lateral play of the body and the tongue while permitting relative vertical movement in the removal of the body from the axle.

7. A vehicle body having a bottom and end portions, the body bottom being constructed and arranged for ready removal from the vehicle and the end portions being constructed and arranged for separation into parts and adapted for reattachment to the parts and adapted for reattachment to the bottom to provide supports for the bottom at the proper height to form a table.

8. In a vehicle of the class described, a body bottom, end pieces adapted to form supports for the body bottom to form a table, removable body side portions for the bottom, and supports permanently attached to the side portions and enabling them to constitute benches when removed from the body bottom.

9. In a vehicle of the class described, a body bottom, means for supporting the body bottom to form a table, removable side portions for the bottom, and leg pieces permanently secured to the side portions one adjacent to each end of each side portion and arranged to extend at right angles thereto, so that the side portions may constitute benches when removed from the body bottom.

10. In a vehicle of the class described, a body bottom, removable end pieces adapted to constitute legs for the body bottom to form a table, removable side portions for the bottom, and leg pieces of the same width as the side portions attached thereto adjacent to each end so that the side portions may be removed and stood upon the leg pieces to form benches.

In testimony whereof I have signed my name to this specification.

LEONARD S. RANKIN.

Copies of this patent may be obtained for five cents each, by addressing the "Commissioner of Patents, Washington, D. C."